(12) United States Patent
Duong et al.

(10) Patent No.: US 6,484,358 B1
(45) Date of Patent: Nov. 26, 2002

(54) FLAME PROOF SEALING MECHANISM

(75) Inventors: Thach Duong, Garden Grove, CA (US); Conrad Boehnlein, Gardena, CA (US)

(73) Assignee: Robertshaw Controls Company, Richmond, VA (US)

( * ) Notice: Subject to any disclaimer, the term of this patent is extended or adjusted under 35 U.S.C. 154(b) by 33 days.

(21) Appl. No.: 09/672,325

(22) Filed: Sep. 28, 2000

(51) Int. Cl.$^7$ .................................................. F16L 5/02
(52) U.S. Cl. ........................ 16/2.1; 16/2.2; 174/152 G; 174/153 G; 248/56
(58) Field of Search ........................... 16/2.1, 2.2, 2.5; 174/152 R, 153 R, 152 G, 153 G; 248/56; 277/602, 603, 616, 625, 628, 630, 637

(56) References Cited

U.S. PATENT DOCUMENTS

| | | | | |
|---|---|---|---|---|
| 3,506,999 | A | * 4/1970 | Neher | 174/152 G |
| 3,991,446 | A | * 11/1976 | Mooney et al. | 16/2.1 |
| 4,216,930 | A | * 8/1980 | Rossler, Jr. et al. | 248/56 |
| 4,354,651 | A | * 10/1982 | Simon | 248/56 |
| 4,474,489 | A | * 10/1984 | Simon | 16/2.5 |
| 4,940,042 | A | 7/1990 | Moore, Jr. et al. | |
| 5,170,017 | A | * 12/1992 | Stanevich et al. | 174/153 G |
| 5,188,324 | A | * 2/1993 | Joseph et al. | 248/222.52 |
| 5,341,767 | A | 8/1994 | Smith | |
| 5,613,406 | A | * 3/1997 | Rutkowski | 248/56 |
| 5,857,780 | A | * 1/1999 | Newberg et al. | 384/206 |
| 5,918,591 | A | 7/1999 | Vollmar et al. | |
| 5,941,200 | A | 8/1999 | Boros et al. | |
| 6,019,069 | A | 2/2000 | Joyce | |
| 6,074,200 | A | 6/2000 | Bowman et al. | |
| 6,109,216 | A | 8/2000 | Reynolds et al. | |

* cited by examiner

Primary Examiner—Chuck Y. Mah
Assistant Examiner—Doug Hutton
(74) Attorney, Agent, or Firm—Fulwider Patton Lee & Utecht, LLP

(57) ABSTRACT

A sealing mechanism for establishing a seal between a barrier material and a conduit that extends there through. The mechanism includes a specially configured opening formed in the barrier material and a grommet component that is inserted into the opening and locked in place by a slight rotation thereof.

14 Claims, 1 Drawing Sheet

FLAME PROOF SEALING MECHANISM

BACKGROUND OF THE INVENTION

The present invention generally relates to devices for sealing the combustion chamber of a gas-fired appliance to prevent the incursion and possible ignition of flammable vapors. More specifically, the invention pertains to a device for allowing various components to extend through a combustion chamber vapor barrier without compromising the seal established by such barrier.

A potential hazard inherent in the operation of a gas-burning appliance is that it may cause flammable vapors to ignite that happen to collect in and around the appliance. Ignition may either be caused by the burner or pilot flame or by an electric or electronic ignitor upon being energized. This is especially problematic in for example water h eaters or furnaces that are located in garages in which cars are parked where the leakage or spillage of gasoline may occur. Once a combustible mixture reaches the appliance, a fire or an explosion may result.

Efforts to address this potential safety hazard have been previously directed toward ensuring adequate ventilation in and around the appliance, the elevation of the appliance to distance it from flammable vapors that are denser than air, and more recently, the isolation or sealing of the combustion chamber from its surroundings. This latter approach not only prevents the incursion of vapors into the combustion chamber but also prevents the propagation of flame therefrom.

A difficulty associated with effectively sealing the combustion chamber of a typical gas-burning appliance is inherent in the necessity for various conduits to extend into the combustion chamber from the exterior of the appliance. The fitment of a sheet metal enclosure about the entire combustion chamber is typically relied upon to form a vapor barrier. The extension of any conduit through such barrier requires that an appropriate opening be formed in the barrier and that any gap between the installed conduit and the surrounding barrier material be closed off. An additional requirement is inherent in the fact that such conduits may have to be removed to allow access to the interior of the combustion chamber or that such conduits will need servicing or replacement at some time during the service life of the appliance. This requires that any sealing device that is in place between the conduit and the vapor barrier must be capable of maintaining an effective seal yet should allow the ready removal of the conduit when it is desired to do so. The sealing device should also be reusable and easily re-installable. Additionally, the sealing device should not deteriorate during the service life of the appliance. Accordingly, it must be capable of withstanding the elevated temperatures it is routinely subjected to due to its proximity to flame and must additionally be able to withstand even higher temperatures as may be mandated by various regulating agencies with regard to fire safety. Finally, the sealing device should be inexpensive to manufacture.

A seal configuration that had previously been considered included a separate grommet and spring combination for each of the various conduits that were extended through the barrier. A spring that was relied upon to maintain each such grommet in place which rendered the installation process rather cumbersome.

A sealing mechanism is needed for use between a combustion chamber enclosure and conduits that extend there through that is capable of maintaining an effective seal, that readily enables the removal and replacement of conduits, that readily enables an effective seal to be reestablished upon reinstallation, that is readily configured to accommodate multiple conduits, that does not deteriorate during the service life of the associated appliance and that is inexpensive to manufacture.

SUMMARY OF THE INVENTION

The present invention provides a sealing mechanism for sealing gaps between a combustion chamber enclosure and conduits that are extended there through. More particularly, a grommet type component is provided which cooperates with a specially configured opening formed in the enclosure material. The device may be configured to accommodate one or more conduits and is repeatedly reusable. Upon insertion through the opening in the enclosure, the grommet component locks into place by a slight rotation thereof.

The opening that is formed in the enclosure material is configured to define a depressed rim from which two diametrically opposed tabs extend inwardly therefrom. The grommet component has distal end configuration that allows it to be inserted into the opening and past the tabs. A flange prevents over-insertion while grooves formed in the sides of the grommet component are precisely dimensioned to receive and grasp the tabs when the inserted grommet is rotated into place. Perforations formed in the grommet component are dimensioned so as to provide a snug fit with the specific conduits that are to be inserted there through. Perforations formed along the edges of the grommet are dimensioned such that a snug fit with a conduit is achieved by a cooperation of the grommet surface and adjacent rim surface.

The sealing device may be configured to accommodate a single conduit or to simultaneously accommodate multiple conduits such as for example a gas line that feeds fuel to the pilot light, thermocouple with which the existence of a pilot flame is monitored and the wiring for a piezo electric ignitor with which the pilot flame is ignited. These components must all necessarily extend through the vapor barrier enclosure to the burner as the controller valve from which they emanate is typically affixed to the exterior of the appliance.

The grommet component is preferably formed by the machining of powdered aluminum. Alternatively, powdered zinc or steel may be used. Die cast aluminum or zinc or machined aluminum or steel are also viable alternatives as is high temperature plastic molding.

These and other features and advantages of the present invention will become apparent from the following detailed description of a preferred embodiment which, taken in conjunction with the accompanying drawings, illustrates by way of example the principles of the invention.

DETAILED DESCRIPTION OF THE PREFERRED EMBODIMENTS

The present invention provides a sealing mechanism for enabling various conduits to be extended through the vapor barrier formed about a combustion chamber of an appliance such as a water heater. The sealing mechanism ensures that the isolation of the combustion chamber is not compromised by the routing of the conduits through the vapor barrier and that the incursion of flammable vapors there into or the propagation of flame therefrom is effectively prevented.

Figure 1:
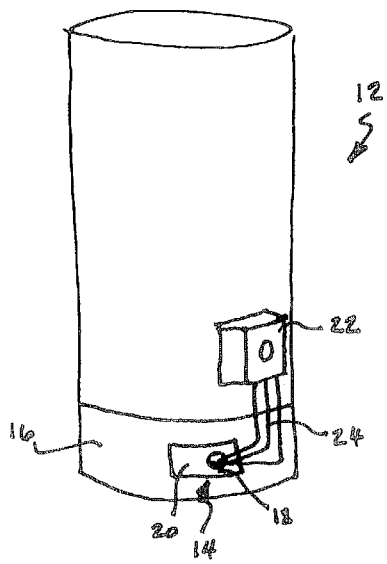
FIG. 1 illustrates the sealing mechanism of the present invention in place on a water heater having a fully enclosed combustion chamber.

FIG. 1 generally illustrates a water heater 12 in which the sealing mechanism 14 of the present invention is employed. The water heater has a sealed combustion chamber wherein a barrier 16 is fitted about the base of the water heater to prevent the incursion of flammable vapors into the combustion chamber and the propagation of flame therefrom. The sealing mechanism of the present invention consists of the combination of a grommet component 18 and a specially configured opening formed in the barrier and may be formed in an access panel or door panel 20 fitted to such barrier. The door or panel provides access to the various components that are situated within the combustion chamber including the burner, the pilot, the ignition system and any thermocouple or thermopile that may be employed. A control mechanism such as a gas valve 22 is shown attached to the exterior of the water heater from which conduits 24 extend into the combustion chamber. The control mechanism regulates the gas flowing to the burner to maintain the temperature of the water within a set range, and controls the lighting and operation of the pilot.

In this particular embodiment, three different conduits 24 are shown extending from the gas valve into the interior of the combustion chamber. Such conduits include the pilot gas supply line, a thermocouple and an ignitor wire. The conduits penetrate the vapor barrier 16 through an opening formed in door panel 20. The grommet component 18 that is received in such opening ensures that the combustion chamber remains substantially sealed.

Figure 2:
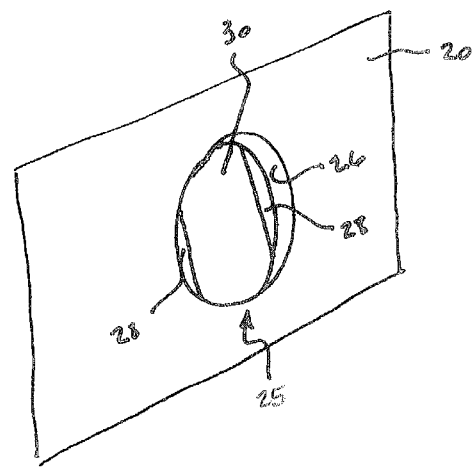
FIG. 2 is an enlarged perspective view of opening formed in the access panel configured for receipt of the grommet component of the present invention.

FIG. 2 is an enlarged perspective view of the circular opening 25 formed in access panel 20. The opening is surrounded by a depressed rim 26 that extends into the combustion chamber and defines an inner surface that is perpendicular to the plane of the panel. Two diametrically opposed tabs 28 extend inwardly from the inner edge of the depressed rim. The two tabs serve to truncate the circular opening to leave an elongated aperture 30 there between.

Figure 3:
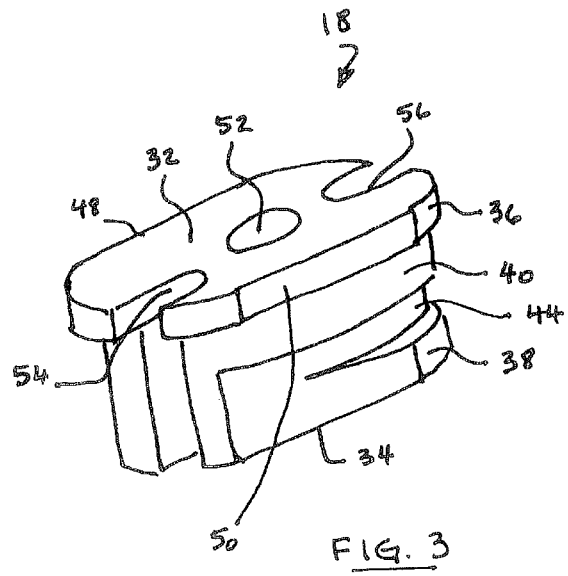
FIG. 3 is an enlarged perspective view of the grommet component of the present invention.
Figure 4:
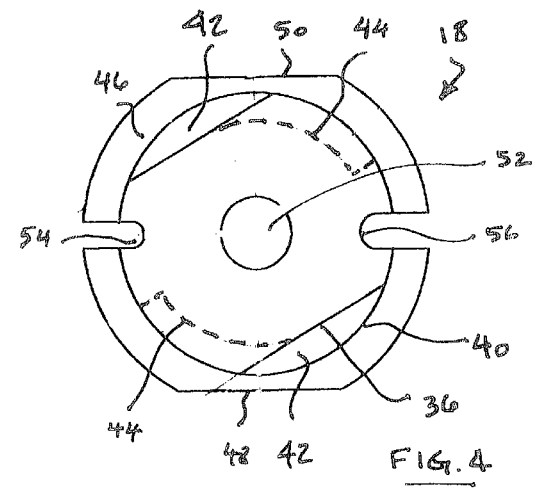
FIG. 4 is a bottom plan view of the grommet component shown in FIG. 3.
Figure 5:
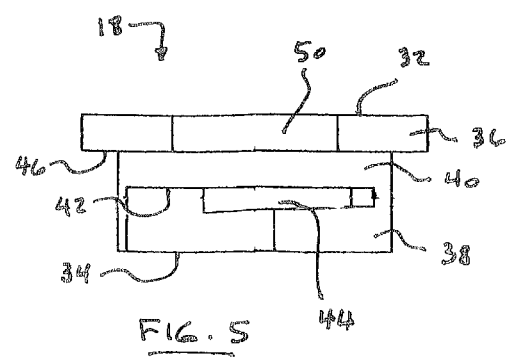
FIG. 5 is a side elevation of the grommet component shown in FIGS. 3 and 4.

FIG. 3 is an enlarged perspective view of the grommet component 18 which is configured for receipt within the opening formed in the barrier material as is shown in FIG. 2. The grommet component has a proximal end 32 and a distal end 34 with three distinctly configured sections there between including proximal section 36, a distal section 38 and an intermediate section 40. As can more readily be seen in the bottom plan view of FIG. 4, the distal section 38 has a cross-section corresponding to a truncated circle which matches the dimensions of the aperture 30 defined in opening 25. The intermediate section 40 has a circular cross-section having a diameter which matches the diameter of the rim surface 26 of opening 24. The distal facing surfaces 42 of the intermediate section that are exposed by the truncation of the distal section define a flange that extends into grooves 44 formed in the side of the distal section. The side view of FIG. 5 illustrates the tapered shape of such grooves wherein the narrower end approximates the thickness of tabs 28. The thickness of the intermediate section corresponds to the depth of the depressed rim 26. The proximal section 36 has a cross-section that is larger than that of the intermediate section to form a flange surface 46 that completely surrounds the intermediate section. The proximal section again defines a truncated circle in which edges 48 and 50 are parallel to one another. Three perforations 52, 54, 56 extend through the grommet component the particular embodiment that is illustrated. Perforations 54 and 56 are formed on the edge of the grommet while perforation 52 is centrally located.

While the barrier panel 20 is die punched sheet metal, the grommet component 18 is preferably formed of powdered metal. As is well known in the art, powdered metal technology requires the metal powder to first be compressed and then sintered in an atmosphere controlled furnace at high temperature in order to bond the powder. The resulting mass is then machined to the tolerances required in this application. Powdered aluminum is the preferred metal for forming the grommet component. Alternatively, powdered zinc or steel may be used. As a further alternative, die cast aluminum or zinc may be used as well as machined aluminum or steel. Finally, molded high temperature plastics may also be a viable alternative for some applications. The dimensions of the cooperating surfaces of the opening 25 in the barrier panel and the grommet component must be within 0.007" of one another, while the inner diameters of the apertures 52, 54, 56 must be within 0.006" of the outside diameters of the conduits that are to be accommodated therein.

In use, the various conduits 24 that are to extend into the combustion chamber are threaded through the perforations 52, 54, 56 in the grommet component 18 and the opening 25 in the barrier panel 20. The respective ends of such conduits may then be appropriately fitted to the controller 22 and to positions within the combustion chamber after which the access panel is fitted to the barrier 20. The grommet component is then advanced along the conduits into the opening formed in the barrier panel. By rotationally orienting the grommet component such that the distal section 38 is extendable between tabs 28, the grommet component is inserted until flange surfaces 42 make contact with the tabs. Subsequent rotation of the grommet component causes the tabs to enter into grooves 44 and prevent retraction of the grommet component. The taper of such grooves causes the tabs to eventually become wedged therein to prevent unintended rotation. The edges of the truncated sections of the proximal section 36 allows a wrench to be applied to forcefully wedge the grommet component into place about the tabs. When properly in position, the conduits extending through the perforations 54, 56, are snugly enclosed by a combination of the grommet and the rim surface 26. Any clearances between the conduits and the surrounding components are less than would allow a quantity of vapors to pass therethrough that would support combustion.

While a particular form of the invention has been illustrated and described, it will also be apparent to those skilled in the art that various modifications can be made without departing from the spirit and scope of the invention. More particularly, it is to be understood that the system can be dimensioned to accommodate different types and different numbers of conduits and can be adapted for use for any appliance in which a sealed combustion chamber is required. Accordingly, it is not intended that the invention be limited except by the appended claims.

What is claimed is:

1. A device for sealing gaps between a substantially planar barrier plate and a conduit passing there through, comprising:
    a section of said barrier plate having a circular opening formed therein, such opening having a circular wall extending perpendicularly therefrom that includes radially inwardly projecting tabs;
    a grommet component having a planar first engaging surface and a circular second engaging surface wherein said first and second engaging surfaces are perpendicular to one another, configured and dimensioned for unobstructed insertion into said opening in said section of barrier plate while in a first rotational orientation and having formed on its periphery circumferentially oriented grooves for receiving said tabs after insertion of said grommet component into said opening and rotation thereof to a second rotational orientation so as to bring both said first engaging surface into direct contact with said planar barrier plate and said second engaging surface into direct contact with said circular wall to form a seal and further having a perforation formed therein for receiving there through said conduit, whereby insertion and rotation of said grommet component locks said grommet component in place to form a seal between said barrier plate and said conduit inserted through said perforation.

2. The sealing device of claim 1, wherein said grommet component comprises a distal section having a cross-section configured for unobstructed insertion into said opening between said tabs and a circular intermediate section having a diameter substantially corresponding to that of the circular wall wherein the circumferential grooves are formed in the periphery of the distal section directly adjacent to the intermediate section.

3. The sealing device of claim 2, wherein said grooves have a tapered width that narrows to less than the thickness of said tabs.

4. The sealing device of claim 3, wherein said tabs are axially offset from an exterior surface of said the barrier plate and the thickness of said intermediate section substantially corresponds to such offset.

5. The sealing device of claim 4, wherein said grommet component includes a proximal section having a cross-section larger than said intermediate section.

6. The sealing device of claim 5, wherein said proximal section has a crosss-ection defining a truncated circle having two parallel edges, whereby a wrench can be applied thereto to rotate said grommet component in said opening formed in said section of barrier plate.

7. The sealing device of claim 1, wherein multiple perforations are formed in said grommet component to accommodate multiple conduits passing there through.

8. The sealing device of claim 7, wherein perforations are formed along side of said grommet component, whereby a conduit accommodated therein is engaged by both the grommet as well as the circular wall extending from said planar barrier upon assembly.

9. The sealing device of claim 7, wherein one of said perforations is dimensioned to accommodate a gas line for supplying gas to a pilot.

10. The sealing device of claim 7, wherein one of said perforations is dimensioned to accommodate a thermocouple.

11. The sealing device of claim 7, wherein one of said perforations is dimensioned to accommodate an ignitor wire.

12. The sealing device of claim 7, wherein perforations are dimensioned to accommodate pilot gas supply line, a thermocouple and an ignitor wire.

13. The sealing device of claim 1, dimensioned and configured for use on a water heater.

14. The sealing device of claim 1, wherein said barrier plate comprises sheet metal and said grommet component is formed of powdered metal.

* * * * *